United States Patent [19]
Boyanton

[11] Patent Number: 5,564,367
[45] Date of Patent: Oct. 15, 1996

[54] COMPACT FENCED ENCLOSURE

[75] Inventor: Richard Boyanton, Social Circle, Ga.

[73] Assignee: R. W. Industries, Inc., Riverdale, Ga.

[21] Appl. No.: 218,746

[22] Filed: Mar. 28, 1994

[51] Int. Cl.$^6$ ................................................. A01K 31/08
[52] U.S. Cl. ............................................. 119/474; 119/481
[58] Field of Search ................................ 119/17, 18, 19, 119/20

[56] References Cited

U.S. PATENT DOCUMENTS

| | | | |
|---|---|---|---|
| 3,550,559 | 12/1970 | Long | 119/20 |
| 4,696,259 | 9/1987 | Fewox | 119/20 X |
| 4,803,951 | 2/1989 | Davis | 119/19 |
| 5,116,256 | 5/1992 | Allen | 119/19 X |
| 5,335,617 | 8/1994 | Hoffman | 119/17 |

Primary Examiner—Gene Mancene
Assistant Examiner—Thomas Price
Attorney, Agent, or Firm—Hopkins & Thomas; Charles H. Fails

[57] ABSTRACT

A compact fenced enclosure (5) having a plurality of generally upright support posts (7), and a plurality of top rails (11) and bottom rails (15) extending in a generally horizontal direction between each support post. Each top rail (11) and bottom rail (15) has a first end and a second end. The first end of each rail is placed in an overlapping relationship with the second end of each adjacent rail on the first and second ends of each support post (7), and secured to support post (7) by a single fastener passing through an opening (33) defined in each arcuate section (32), and through matching opening (34) defined in the first and second ends of each support post (7) forming an enclosure about the space. Enclosure (5) also includes a gate assembly (24) supported on frame (6) for permitting passage into and out of the space, and chain link fencing (26) attached to frame (6) and gate assembly (24) for enclosing the space defined by said enclosure.

16 Claims, 4 Drawing Sheets

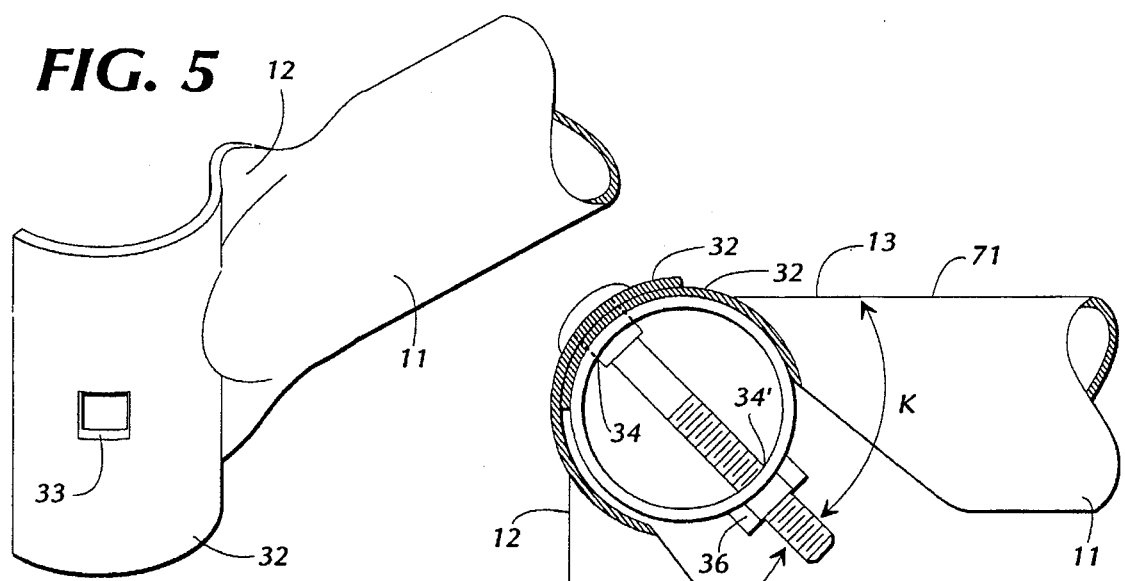
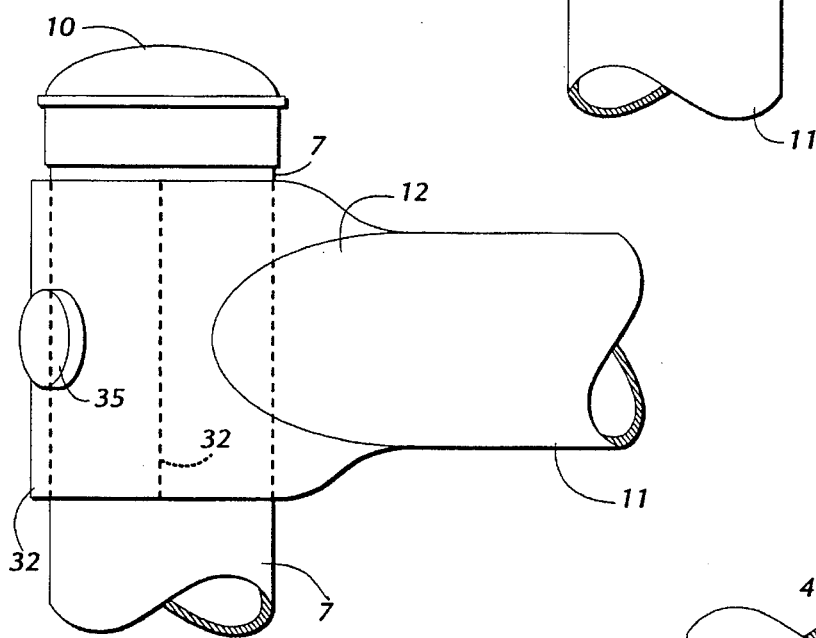
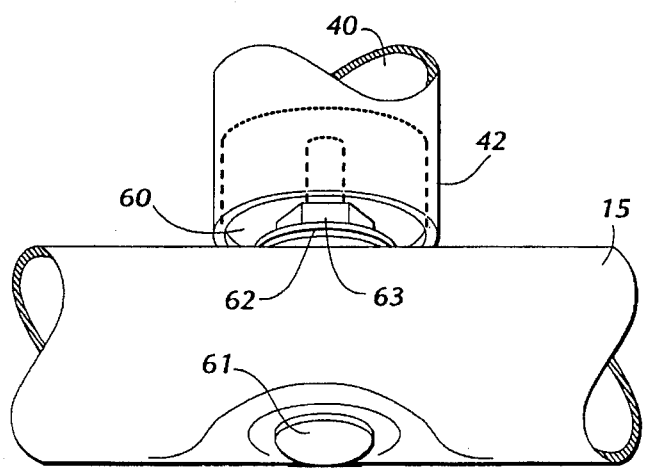

COMPACT FENCED ENCLOSURE

FIELD OF THE INVENTION

This invention relates in general to a kennel for animals or the like. More particularly, this invention relates to an apparatus and a method for a compact kennel.

BACKGROUND OF THE INVENTION

Animal kennels and fencing systems for enclosing animals within a defined space are known in the art. The earliest attempts to confine animals to a defined or enclosed space go back in time to man's earliest efforts to construct corrals and similar fenced enclosures for the control of livestock, such as, for example, cows and horses. As man began to transition from a largely agrarian or rural society to a more urban society, dogs and other working animals traveled from the farms to the cities too. However, the problem soon arose that dogs could not be allowed to wander the streets of the cities and suburbs for public safety and health reasons. Moreover, dogs left to wander the streets on their own would often times get into territorial disputes, leading to dog fights which can injure both man and animal.

Accordingly, the need for kennel systems to restrain dogs and other domestic animals arose. In response to this need, a number of prior art kennel systems came about.

A typical prior art kennel system uses a series of fence panel subframe assemblies which can be formed into an enclosure about a defined space for confining an animal. However, each fence panel is constructed separately, and has its own pair of opposed support posts and a pair of generally horizontal rails extending between the posts forming the rigid frame upon which chain length fencing or other fence means are secured to enclose the sides of the space formed by the subpanels. This results in an enclosure having at least two support posts at every point where the subpanels join one another. The support posts in these prior art kennels are held together by clamps or bands, with the result that if the panels of these prior art kennels are moved relative to each other so that rather than forming a generally square or rectangular shape, the kennel takes a parallelogram or diamond shape, the kennel becomes suspectable to collapse if pushed on or leaned against by an animal on the inside or outside of the kennel. In addition, a panel subframe kennel in a square shape, for example, would have eight support posts rather than only the four needed to enclose the space in which the animal is confined. This duplication of parts used to construct the kennel results in both increased weight and cost of the kennel.

The fence panels of prior art kennels using a plurality of fence panels to form a kennel can be constructed of either one elongated tube which is bent at three corners and welded at the fourth corner to construct a generally rectangular or square fence panel. The result of this type of constrtction, however, is that once the fence panel has been assembled at its place of manufacture, it must be transported in the stream of commerce, and to the ultimate user's location, as a completed subpanel, which can be quite large and difficult to handle. This creates problems not only with handling the fence panel, but also with the shipment of the fence panel to, and storage of the fence panel at, the point of sale from which the fence panels are purchased.

Another type of prior art fence panel assembly uses two separate support posts at its ends, as well as a top and a bottom rail. In this type of panel the rail is connected by conventional chain link fence fixtures to the support post at its upper and lower ends. However, although this might solve the problem of a kennel which can be shipped broken down in its component parts, once the kennel is erected, the same problem that exists with the prior art kennels arises, namely that there will be at least two support posts present where each fence panel meets the other.

Thus, the need exists for an improved compact animal kennel which is easy to transport to the point of sale, can be stored efficiently at the point of sale, and can be easily transported to its end use location, and thereafter simply and quickly assembled with a minimal number of parts in order to reduce the cost of the kennel, as well as to simplify the construction of the kennel.

The present invention also provides both an apparatus and a method for an improved, compact fence enclosure, or kennel, which can be easily transported and stored, is simple in construction, but yet can be easily and quickly assembled or disassembled for use at a second location. This is accomplished in the present invention by providing a compact fenced enclosure having a frame, the frame including a plurality of generally upright support posts, each post having a first and a second end, and a plurality of top and bottom rails extending in a generally horizontal direction between each of the support posts, each top and bottom rail having a first end and a second end. The first end of each top and bottom rail is fastened to the second end of each adjacent top and bottom rail in overlapping fashion on the exterior periphery of each support post at its first, or top end, as well as at its second, or bottom, end, respectively. Thus, as constructed, the posts and rails form an enclosure about the space in which an animal, or a number of animals, is to be confined. The frame also has a gate assembly supported on the frame for permitting passage into and out of the enclosed space. Lastly, chain link fencing is attached to the frame, thus enclosing the space defined by the enclosure.

Each top and bottom rail, has an upright arcuate section formed at its first and second ends. The arcuate sections are placed in an overlapping relationship and fastened to each other as well as to the first and second end of each support post. Each arcuate section on the ends of each rail is sized and shaped to fit in an overlapping relationship on the arcuate section at the end of any other rail on the exterior periphery of any support post. An opening is provided in each arcuate section and passes therethrough, as well as a matching opening defined in both the first and second end of each support post, so that when the arcuate sections of each rail are placed in an overlapping relationship on the periphery of each support post, the openings in the arcuate section and the openings in the support posts are placed in registry with each other so that only a single fastener need be passed through each opening to secure the top and bottom rails, respectively, to each support post.

Thus, this invention also provides an improved method of assembling a compact kennel by providing an apparatus which can be assembled by fastening the first end of each bottom rail to the second end of each adjacent bottom rail with a single fastener on the second end of each support post, fastening the first end of each top rail to the second end of each adjacent top rail with a single fastener on the first end of each support post, mounting a gate assembly to the frame, then attaching chain link fencing to the frame and gate assembly to fully enclose the sides of the space defined by the kennel. Constructed in this fashion, the kennel of the instant invention is quickly and easily erected on site using a minimal number of parts to not only reduce the costs of manufacturing each kennel, but to also simplify the assembly of each kennel at the site of its intended use.

Thus, it is an object of this invention to provide an improved compact kennel which requires a minimal amount of space for shipment and storage, and which is easy and simple to assemble.

Another object of this invention to provide a compact kennel which has a minimal number of parts to both reduce the cost of manufacturing each kennel, and to thus simplify the assembly of each kennel.

It is another object of this invention to provide a compact kennel which can be easily manufactured, packaged and shipped for both storage and transport thus minimizing shipment and storage costs for each kennel.

It is still another object of the present invention to provide an improved compact kennel which is simple in design and inexpensive to construct, is durable and ragged in structure, and can be easily assembled for use.

Still another object of the present invention is to provide an improve kennel which, when assembled, is rigid in structure so that it will safely and securely enclose an animal within the kennel.

These and other objects, features and advantages of the invention will become apparent upon reading the specification when taken into conjunction with the accompanying drawings, wherein like characters of reference designate corresponding parts throughout the several views.

BRIEF DESCRIPTION OF THE DRAWINGS

FIG. 5 is a cut-away perspective view showing the arcuate section formed at the ends of each rail forming the compact fenced enclosure illustrated in FIG. 1.

FIG. 6 is a cut-away elevational view showing the overlapped arcuate sections at the end of each rail placed on the exterior periphery of a support post.

FIG. 7 is a cut-away plan view along line 7—7 of FIG. 6.

FIG. 8 is a cut-away perspective view showing the bottom of the gate assembly supported on the frame of the compact fenced enclosure illustrated in FIG. 2.

DETAILED DESCRIPTION

Figure 1:
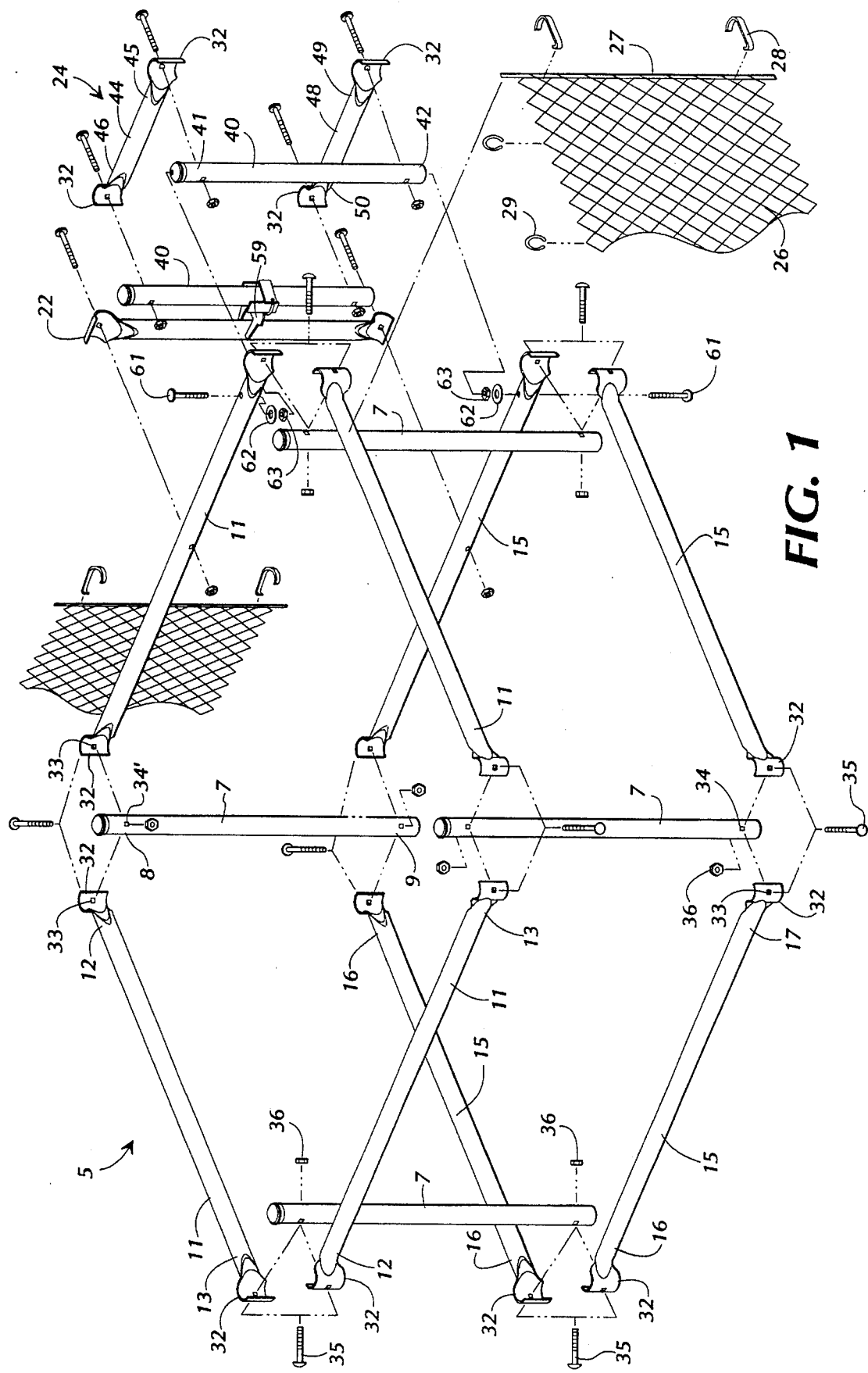
FIG. 1 is an exploded perspective view of the compact fenced enclosure.

Referring now in detail to the drawings in which like reference numerals indicate like parts throughout several views, numeral 5 of FIG. 1 illustrates a preferred embodiment of the compact fenced enclosure. Compact fenced enclosure 5 is constructed of four generally upright support posts 7, one placed at each corner of the space defined by the enclosure, which is shown in both FIGS. 1 and 2 as a generally square or rectangularly shaped kennel. Each support post 7 has a first end 8 located at the top of the support post, and a second end 9 located at the bottom of the support post. Four top rails 11, each having a first end 12 and a bottom end 13, and four bottom rails 15, each having a first end 16 and a second end 17, extend in a generally horizontal direction between each of support posts 7, and are fastened to first end 8 and second end 9 of each support post 7, respectively. As shown in both FIGS. 1 and 2, each top rail 11 and bottom rail 15 is fastened to support post 7 by a carriage bolt 35 and a nut 36 passed through the end of each rail at the support post. The manner in which each top rail 11 and bottom rail 15 is fastened to first end 8 and second end 9 of each support post 7 is explained in greater detail below. Thus assembled, frame 6 is formed from posts 7 and rails 11 and 15.

Still referring to FIG. 1, compact fenced enclosure 5 also has a vertical support post 22 which is fastened at its ends to top rail 11 and bottom rail 15 for providing additional structural support and rigidity to frame 6 and gate assembly 24. Gate assembly 24 is provided for permitting passage into and out of the space, and is constructed so that the gate assembly can be placed into a closed position on the frame for enclosing the space defined by enclosure 5.

Figure 2:
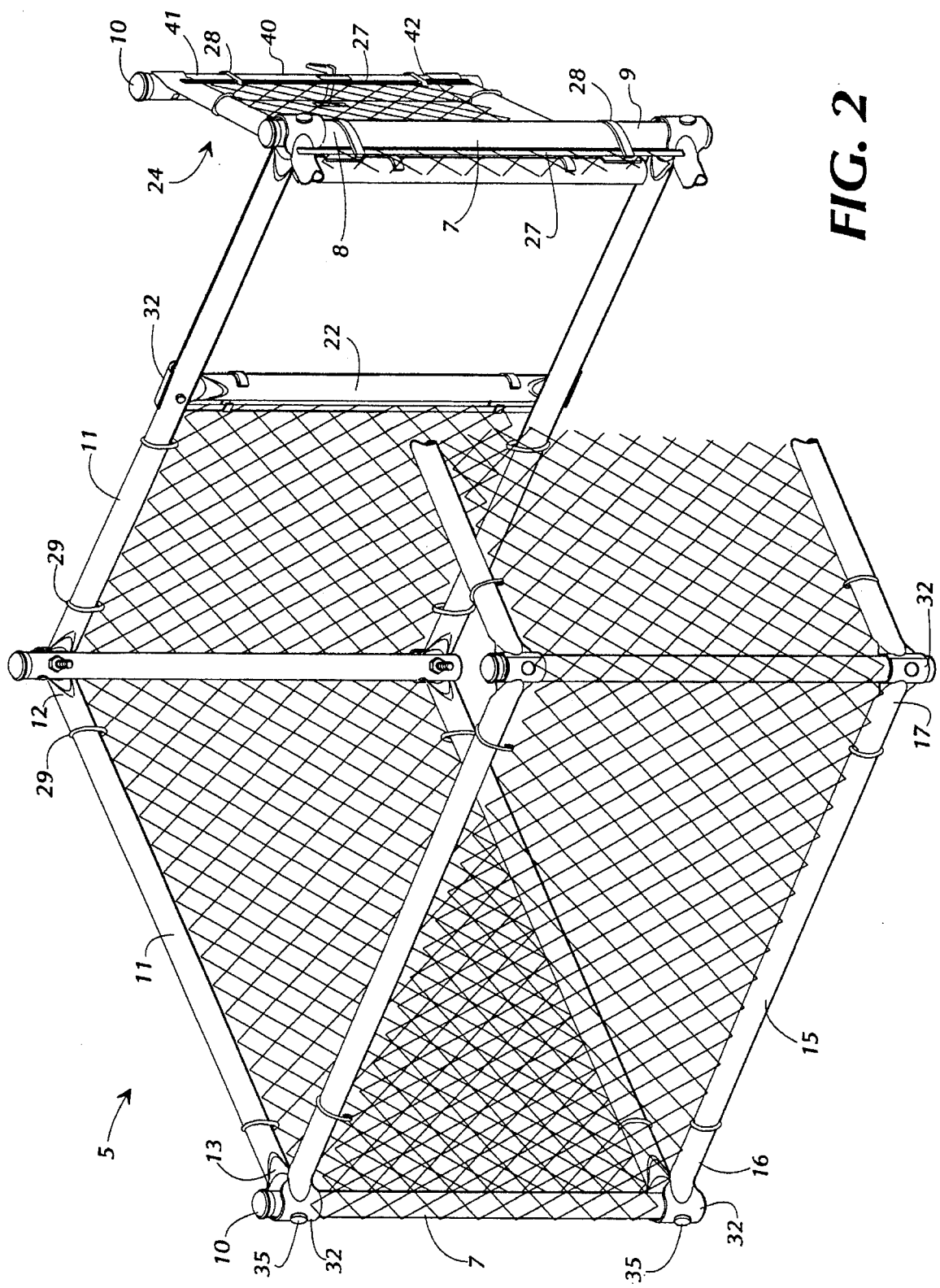
FIG. 2 is a perspective view of the compact fenced enclosure illustrated in FIG. 1.
Figure 3:
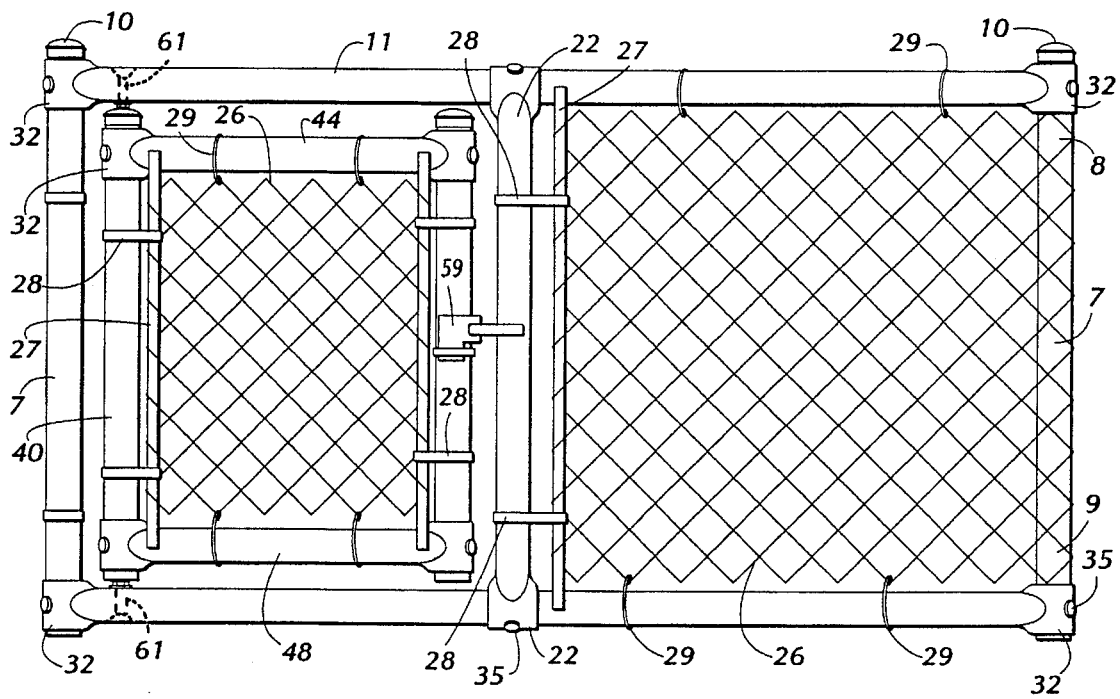
FIG. 3 is a side elevational view of the compact fenced enclosure illustrated in FIG. 2.

Again referring to FIGS. 1 and 2, compact fenced enclosure 5 also has a section of chain link fencing 26 attached to frame 6. Chain link fencing 26 is of a generally rectangular shape, is made of one piece of fencing, and has two ends, a top, and a bottom side. Two tension rods 27 are provided. A tension rod 27 is passed through each end of chain link fencing 26 and secured to one of support posts 7 and vertical support post 22 by a plurality, in this instance 2, chain link clips 28. Lastly, as is best shown in FIGS. 2 and 3, the top and bottom sides of chain link fencing 26 are secured to top rails 11 and bottom rails 15 by a plurality of fence ties 29 placed through the top and bottom of chain link fencing 26 and around each of top rails 11 and bottom rails 15, respectively.

Compact fenced enclosure 5, as illustrated herein, is constructed of one and three-eights inch diameter galvanized tubing with a wall thickness ranging from 0.035 inches to 0.055 inches. The wall thickness of the tubing used in constructing frame 6 and gate assembly 24 will be dependent upon the amount of strength desired and or needed in the enclosure, as well as the size of the enclosure. Chain link fencing 26 is a conventional galvanized section of fencing. Chain link fencing is constructed of either nine, eleven and a half, or 12 gauge steel wire, again dependent on the strength desired in the kennel. This in turn will depend on the type of animal(s) kept in the kennel, as well as the service environment of the kennel. Similarly, carriage bolt 35 and nut 36, as well as the associated hardware for chain link fencing 26, tension rods 27 and chain link clips 28, are constructed of galvanized steel. Fence ties 29 can be made of galvanized steel or aluminum wire, or if so desired, of plastic cable ties.

Compact fenced enclosure 5 is finistied as a galvanized steel apparatus, and does not need to be surface coated or painted, as the galvanized finish provides a durable weather resistant finish for the enclosure. However, it is anticipated that enclosure 5 can be painted, or more preferably powder coated, for a durable and lasting finish in any number of colors available through a conventional powder coating process. This would include the powder coating of frame 6, gate assembly 24, and chain link fencing 26.

It is understood by those skilled in the an that each of top rails 11 and bottom rails 15, as well as support posts 7, gate posts 40, and fence rails 44 and 48 can be constructed of telescoping sections of tubing which can be fit end to end so that one elongated rail or support post is created. This is accomplished through conventional means which are known to those skilled in the art. In this manner, however, it is possible that compact fenced enclosures could be packaged in a kit with a plurality of rail sections yielding a certain foot length, and bundled with a chain link fence section 26 of the same length, so that the consumer who purchases and assembles the kennel can customize the kennel to make it of a length and width sufficient to meet his or her needs. It is intended that, as manufactured, compact fenced enclosure 5 can be shipped as a kit to the point of sale, or to the consumer who will assemble the enclosure.

Figure 4:
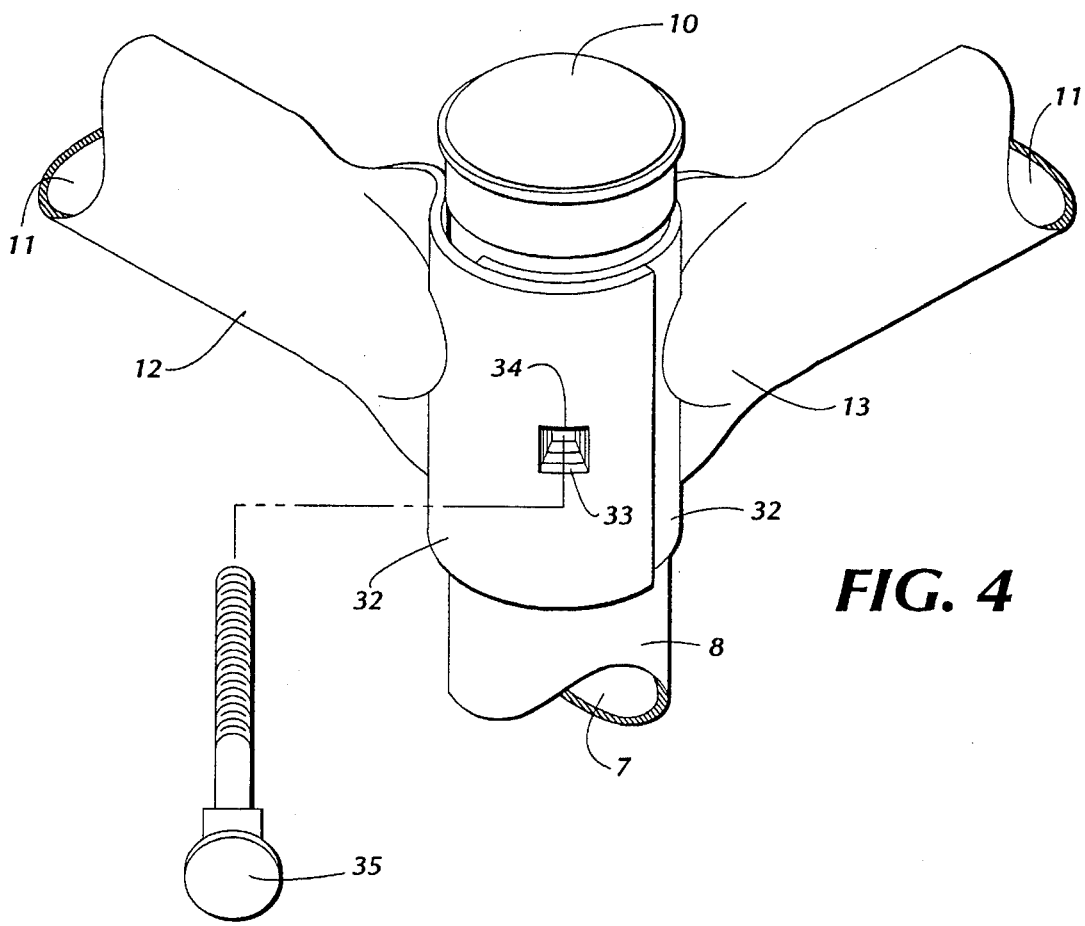
FIG. 4 is a cut-away perspective view showing how the rails of the compact fenced enclosure are secured to the support posts.

As best shown in FIGS. 4 through 7, and as seen from FIG. 1, each first end 12 and second end 13 of top rail 11, each first end 16 and second end 17 of bottom rail 15, and each end of the vertical support post 22 has an arcuate section 32 formed thereon. Arcuate section 32 is formed in the end of each of rails 11 and 15, and at the ends of vertical support post 22, in a conventional metal forming machine such as a press sized and shaped to process the one and three-eights inch diameter galvanized tubing which comprises each support post 7, rails 11 and 15, vertical support post 22, and gate assembly 24, so that the hollow tubing is essentially collapsed into a solid one piece arcuate section. Arcuate section 32 is sized and shaped to have a radius complimentary to the radius of support post 7 and vertical support post 22 so that each end of each top rail 11 or bottom rail 15, as well as top gate rail 44 and bottom gate rail 48 fit in an overlapping relationship on the exterior periphery of each support post 7 and vertical post 22, and gate posts 40, respectively. Referring now to FIG. 5, each arcuate section 32 as an opening 33 defined therein and passing therethrough for receiving a carriage bolt 35 (FIGS. 4 and 7).

As shown in FIG. 4 and FIG. 7, it is intended that the arcuate ends 32 of each rail 11 and 15 will overlap the other, and will be placed on the exterior periphery at the first end 8 or second end 9 of one of support posts 7. This is best shown in FIGS. 1 and 7, where first end 12 of a top rail 11 is shown adjacent a second end 13 of a second top rail 11 in overlapping relationship on the exterior periphery of a support post 7, here its top end 8, so that a single carriage bolt 35 is passed through opening 33 in each arcuate section 32 (FIG. 5) and through matching opening 34 and opening 34' defined in first end 8 and second end 9 of each support post 7. As shown in FIG. 4, opening 33 in each arcuate section 32, and matching opening 34 in the first and second ends of support post 7 is sized and shaped to receive the head and shank portion of a carriage bolt so that the square portion of the carriage bolt is held in openings 33 and 34, while the free or threaded end of carriage bolt 35 is passed through axially aligned opening 34', which can be circular, defined in the opposite tube wall of both the first and second ends of support posts 7.

As best shown in FIG. 7, once carriage bolt 35 has been passed through each of openings 33 in each of arcuate sections 32, as well as through matching opening 34 and opening 34' in one of the ends 8 or 9 of a support post 7, nut 36 is threaded on carriage bolt 35 for securely holding each end of each adjacent rail to the other, in an overlapping relationship, on the exterior periphery of a support post 7. Also, and as shown in FIG. 7, carriage bolt 35 forms an acute angle K with exterior surface 71 of either top rail 11 or bottom rail 15 at each of the corners of enclosure 5 formed by each of support posts 7.

Thus, it is a feature of this invention that a single fastener, in this instance a carriage bolt, however any conventional fastener will suffice, is passed through each end of each arcuate section of each rail placed in an overlapping relationship on a matching opening 34 defined in either the first end 8, or second end 9, of a support post 7, so that only 8 carriage bolts 35 are needed to completely erect frame 6 of enclosure 5. Moreover, once frame 6 is erected, there is only a single support post at each corner of the enclosure. Due to the overlapping nature of each arcuate section 32 on the exterior periphery of each support post 7, coupled with a single carriage bolt 35 passed through each of the arcuate sections at the ends of the support post, frame 6 is thus formed as a lightweight, yet rigid structure which is not susceptible to deformation i.e, it will resist deforming from a generally rectangular or square shape to an unbalanced shape due to an animal or person pushing against any support post 7 so that the sides resist deformation into the shape of a diamond or parallelogram, with the potential likelihood that the kennel would lose its structural stability and ultimately collapse. Also, by constructing enclosure 5 in this fashion, the amount of materials used for the construction of any one kennel are minimized, thus conserving both the amount of materials needed and the cost to manufacture the kennel, making the kennel lighter and easier to assemble while still providing a rigid and durable structure.

Gate assembly 24, as best illustrated in FIGS. 1, 2 and 3, is constructed in fashion similar to frame 6, and includes two generally upright gate posts 40, each gate post having a first end 41 and a second end 42, and a generally horizontal top rail 44 and bottom rail 48 extending between each of gate posts 40. Top rail 44 has a first end 45 and a second end 46. Similarly, bottom rail 48 has a first end 49 and a second end 50. Gate assembly 24 can also be provided with any number of intermediate horizontal rails (not illustrated) for strengthening the gate assembly. For example, if gate assembly 24 is 6 feet high, an intermediate rail will be provided midway between top rail 44 and bottom rail 48. Each of gate posts 40 is constructed in fashion similar to each of support posts 7, the requirement for each gate post 40 being that it be shorter than each support post 7 so that gate assembly 24 fits between a top rail 11 and a corresponding bottom rail 15 on frame 6.

An arcuate section 32 is formed at first end 45 and second end 46 of top rail 44, and at first end 49 and second end 50 of bottom rail 48 in fashion identical to each arcuate section 32 formed at the ends of top rail 11, bottom rail 15, and vertical support post 22. Thus, as illustrated in FIG. 5, arcuate section 32 at each end of top rail 44 and bottom rail 48 has an opening 33 formed therein for receiving the head and shank of a carriage bolt 35. However, and unlike FIGS. 4, 6, and 7, arcuate sections 32 of rails 44 and 48 are placed on the exterior periphery on each of gate posts 40 at first end 41 and second end 42 only, without placing the ends of the rails in an overlapping relationship on the ends of an adjacent rail as the rails and posts used in the construction of gate assembly 24 do not form an enclosure similar to frame 6. Rather, posts 40, and rails 44 and 48 only form the door frame for a gate to be mounted on frame 6.

However, even though the ends of rails 44 and 48 do not overlap the ends of an adjacent rail on gate posts 40, opening 33 defined in each of arcuate sections 32 on rails 44 and 48 are still defined in arcuate section 32 so that carriage bolt 35 passed through opening 33 and the openings in gate post 40 forms an acute angle K with the exterior wall of each rail 44 and 48 facing away from the space enclosed by frame 6. The arcuate sections 32 of rails 44 and 48 are made this way strictly for ease of fabricating the parts needed for enclosure 5, and in particular gate assembly 24, so that the machinery which forms each of arcuate sections 32 in each of rails 11, 15, 44 and 48 need not be reset, nor a second machine needed just to create arcuate section 32 in the ends of the rails 44 and 48 used in the construction of gate assembly 24.

Although it is not illustrated, it is anticipated that each of arcuate sections 32 formed at the ends of gate assembly rails 44 and 48 can have an opening 33 defined therein, as well as openings (not illustrated) in each of gates posts 40 fabricated so that carriage bolt 35 would pass through arcuate section 32, and into and through each gate support posts 40 perpendicularly to the longitudinal axis of gate assembly top rail 44 and bottom rail 48. Similarly, openings 33 in arcuate sections 32 of vertical support post 22 can be oriented perpendicularly to rails 11 and 15.

Referring now to FIGS. 1 through 3, gate assembly 24 also has a section of chain link fencing 26, having two tension rods 27, one placed through each end of fencing section 26, securing fencing section 26 to each of gate posts 40 by chain link clips 28. Also, in fashion similar to the manner in which chain link fencing 26 is secured to frame 6 of the enclosure 5, chain link fencing 26 of gate assembly 24 is secured to top rail 44 and bottom rail 48 by fence ties 29.

Gate assembly 24 is also provided with a latch 59 for securing gate assembly 24 in a closed position (FIG. 3) on frame 6, thus fully enclosing the space defined by compact fenced enclosure 5. As best shown in FIGS. 2 and 3, gate assembly 24 is moveable between a generally open position (FIG. 2) and a closed position (FIG. 3). This is accomplished through a plug 60 which is fitted in each end of one of gate posts 40, best illustrated in FIG. 3 and in FIG. 8, where a plug 60 is shown mounted inside the second end 42 of a gate post 40 adjacent a bottom rail 15 of frame 6. A pivot bolt 61 is passed through a pair of axially aligned openings (not illustrated) formed in a top rail 11 and a corresponding bottom rail 15, whereupon a conventional washer or spacer 62 is passed over the threaded end of pivot bolt 61 extending through the rail, and nut 63 threaded onto the threaded end of pivot bolt 61. The head of pivot bolt 61, as best shown in FIG. 8, is held in a recess in both top rail 11 and bottom rail 15 of frame 6. Thus, once pivot bolt 61 has been passed through one of bottom rails 15 of frame 6, and spacer 62 passed over pivot bolt 61 and a nut 63 threaded onto the pivot bolt, the gate post 40 having plugs 60 mounted therein is placed on the portion of the pivot bolt extending through the bottom rail of frame 6. A matching pivot bolt 61 is passed through a pair of corresponding and axially aligned openings in top rail 11 through a spacer 62, and a nut 63 is threaded thereon, while the free end of pivot bolt 61 extending through top rail 11 proceeds into plug 60 held in first end 41 of gate post 40 so that gate assembly 24 pivots about both of pivot bolts 61 mounted to frame 6.

Due to the unique manner in which the ends of each top rail 11 and bottom rail 15, as well as the ends of rails 44 and 48 of gate assembly 24 are formed, with an arcuate section 32, and in particular due to the overlapping relationship of first ends 12 and second ends 13 of top rails 11, and first ends 16 and second ends 17 of bottom rails 15 on each of support posts 7, compact fenced enclosure 5 can be quickly assembled to provide a durable and rigid structure. This is accomplished in the following fashion, and is best illustrated by resort to FIG. 1.

Compact fenced enclosure 5 is manufactured from a number of separate parts, as illustrated in FIG. 1. All of these parts together, to include the chain link fencing sections 26 of frame 6 and gate assembly 24, can be easily and inexpensively packaged and shipped from the site of manufacture to the point of sale, and thereafter to the location where the kennel will be assembled and used. All the parts can be packaged and shipped in a box or boxes. Once the box is opened, and the parts are laid out, arcuate section 32 at the first end 16 of a bottom rail 15 is placed in overlapping relationship with the arcuate section 32 at second end 17 of an adjacent bottom rail 15 on the exterior periphery of a support post 7 at its second end 9. Each of openings 33 in each of arcuate sections 32 at the first and second end of the adjacent bottom rails, respectively, is placed in registry with the other, and in registry with matching opening 34 and opening 34' formed in second end 9 of support post 7. A single carriage bolt 35 is then passed through each of the openings toward the inside of the space to be enclosed by enclosure 5, and a nut 36 threaded on carriage bolt 35. This is repeated three more times so that the bottom rails 15 of enclosure 5 form a generally square or rectangular shape, frame 6, having a support post 7 fastened at each corner of the enclosure.

Thereafter, and in fashion similar to the fastening of bottom rails 15 to support post 7, the arcuate section 32 at first end 12 of a top rail 11, and the arcuate section 32 at second end 13 of an adjacent top rail 11 are placed in an overlapping relationship on the first end 8 of a support post 7, so that each of openings 33 defined in each of arcuate sections 32 at the ends of the top rails, and matching opening 34 and opening 34' of support post 7, are all placed in registry. A single carriage bolt 35 is passed through the openings toward the inside of the space, a single nut 36 is then threaded onto the carriage bolt. When completed, frame 6 has been erected.

Once frame 6 has been erected, gate assembly 24 is assembled in similar fashion, without the overlap of any arcuate sections 32 on each other, and is mounted to frame 6 by a pair of pivot bolts 61 in axial alignment in a top rail 11 and bottom rail 15, respectively. As described above, pivot bolt 61 is passed through the openings (not illustrated) defined in bottom rail 15, so that pivot bolt 61 extends through the bottom rail, a washer or spacer 62 is placed over the pivot bolt, and a nut 63 threaded onto the pivot bolt so that pivot bolt 61 is held securely in position in bottom rail 15. The gate post 40 having plug 60 mounted on first end 41 and second end 42 of the gate post is then placed on the bottom pivot bolt 61, and held in position while a second pivot bolt 61 is passed through a pair of openings (not illustrated) defined in top rail 11, a washer or spacer 62, and a nut 63 threaded on the end of second pivot bolt 61 so that pivot bolt 61 extends through top rail 11 into the second of plugs 60 held at the first end 41 of gate post 40, thus forming an axis about which gate assembly 24 pivots into a generally open position (FIG. 2) and a closed position (FIG. 3).

Next, chain link fencing 26 is attached to frame 6 by passing a tension rod 27 through each end of chain link fencing 26, securing the tension rods to a support post 7 and a vertical support post 22, or to two vertical support posts 7 of frame 6 if gate assembly 24 forms one complete side of enclosure 5, by chain link clips 28. Thereafter, fence ties 29 are passed through the top and bottom of chain link fencing 26 and around top rails 11 and 15 to tie chain link fencing section 26 to frame 6.

The same procedure is followed to attach a second and smaller chain link fencing section 26 to gate posts 40 and rails 44 and 48 forming the frame of gate assembly 24. Latch 59 is then connected to gate post 40 opposite the gate post having the pivot bolts and plugs therein, so that gate assembly 24 can be latched or secured into a closed position on frame 6 (FIG. 3).

Although compact fenced enclosure 5 is shown as a generally square or rectangular enclosure or kennel having only four sides and four corner support posts, it is understood by those skilled in the art that enclosure 5 can be constructed and modified so that it forms a modular kennel system (not illustrated). Thus, constructed as a modular kennel system, enclosure 5 would be supplied with a number of intermediate support posts which would replace two or more of support posts 7. The intermediate support posts will be used to extend frame 6 in width and or depth. The intermediate support posts provided for a modular kennel system would be fashioned and constructed in the manner similar to each of support posts 7 shown in FIGS. 1 through 8. However, the arcuate sections 32 of each top rail 11 and bottom rail 15 which are placed in an overlapping relationship on the exterior periphery of each intermediate support post, on its first and second ends, would be sized and shaped so that a carriage bolt, similar to carriage bolt 35 in FIG. 7, would be extended through each arcuate section 32 and intermediate support post perpendicularly to the longitudinal axis of each rail, rather than forming acute angle K as shown in FIG. 7. Accordingly, opening 33 of arcuate section 32, unlike FIGS. 5, 6, and 7, would be oriented on the lateral axis perpendicular to the longitudinal axis of each rail, rather than being placed at an angle K as shown in FIG. 7. However, the ends of each rail, both top and bottom, which are received on the four corner support post 7 would be fashioned, and thus sized and shaped, as are the arcuate sections shown in FIGS. 5, 6, and 7, and as described above for compact fenced enclosure 5.

Similarly, it is understood by those skilled in the art, that the apparatus and method by which compact fenced enclosure 5 is constructed and erected can be used as a basis for forming a modular panel system to create modular fence panels for either kennels similar to the prior art kennels; or for forming modular panels, for example, for use as gates in chain link fence installations at homes or businesses. Moreover, it is understood by those skilled in the art, and it is anticipated that compact fenced enclosure 5 can be adapted for use as a modular fencing system for a home or business, so that, for example, a consumer would purchase a complete fencing system, including support posts, top rails, and bottom rails, as well as chain link fencing and all of its associated hardware, to install chain link fencing around their yard, home, or place of business. The advantage of providing a modular fencing system, such as described herein, is that it can be easily manufactured as is compact fenced enclosure 5, and can be quickly and easily moved in interstate commerce to the point of sale or to the ultimate purchaser, and thereafter assembled to provide a simple yet durable and rigid structure for fencing off a yard, house, swimming pool, or the like.

While a preferred embodiment of the invention has been disclosed in the foregoing specification, it will be understood to those skilled in the art that variations and modifications thereof can be made without departing from the spirit and scope of the invention, as set forth in the following claims.

I claim:

1. A compact fenced enclosure for holding an animal within a defined space having at least one side, said enclosure comprising:

a frame, wherein said frame has plurality of generally upright support posts, each of said posts having a first end and a spaced second end, and a plurality of top and bottom rails extending in a generally horizontal direction between each of said posts, wherein each of said top and said bottom rails has a first end and a spaced second end;

an arcuate section formed at the first end and at the second end of each said rail, wherein each of said arcuate sections is oriented along a generally upright axis with respect to said rail, and wherein each of said arcuate sections is sized and shaped to fit in an overlapping relationship on the arcuate section at the end of each adjacent one of said rails, respectively, on at least a portion of the exterior periphery of each of said support posts, respectively;

an opening defined within each arcuate section and passing therethrough, wherein each of said openings in each of said arcuate sections is in registry with one another when said arcuate sections are placed in said overlapping relationship on one of said support posts;

a matching opening defined in the first end and in the second end of each of said support posts and passing therethrough, wherein each of said matching openings is in registry with each of said openings defined in each of said arcuate sections when said arcuate sections are placed in said overlapping relationship on said support posts;

fastening means passed through each of said openings in the arcuate sections of said rails and said matching openings in said support posts when said arcuate sections of said rails are placed in said overlapping relationship on the exterior periphery of said support posts;

a gate assembly supported on said frame for permitting passage into and out of the space; and fence means, disposed on said frame, for enclosing the space defined by said enclosure.

2. The enclosure of claim 1, wherein each of said support posts and each of said top and bottom rails comprises a generally circular tube.

3. The enclosure of claim 2, wherein said tube comprises galvanized steel.

4. The enclosure of claim 1, wherein said fastening means comprises a plurality of carriage bolts and a nut threadedly received on each of said carriage bolts, and wherein each said opening defined in each said arcuate section and each said matching opening defined in each said support post is sized and shaped to receive one of said carriage bolts therein.

5. The enclosure of claim 4, wherein each said carriage bolt forms an acute angle with respect to each of said rails on the inside of the space defined by the enclosure in each said support post through which one of said bolts is passed.

6. The enclosure of claim 1, wherein said gate assembly comprises:

a pair of generally upright gate posts, each of said posts having a first end and a spaced second end;

a top gate rail and a bottom gate rail extending in a generally horizontal direction between each of said gate posts, wherein each of said rails has a first end and a spaced second end;

means for fastening each said gate rail to each said post, wherein one each of said rails is fastened to the first end and to the second end of each of said posts;

fence means, disposed on said posts and said gate rails, for enclosing the space along said gate assembly;

pivot means for pivoting said gate assembly into a generally open position and into a closed position; and latch means for securing said gate assembly in said closed position on said frame.

7. The enclosure of claim 6, wherein said pivot means comprises:

a plug fitted in the first end and in the second end of one of said gate posts; and a pair of pivot bolts passed through said frame and extending into one each of said plugs for permitting said gate assembly to pivot about said bolts.

8. The enclosure of claim 6, wherein said means for fastening said gate rails to said gate support posts comprises:

an arcuate section formed at the first end and at the second end of each said gate rail, said arcuate sections being oriented along a generally upright axis with respect to each said rail, and wherein each of said arcuate sections is sized and shaped to fit in an overlapping relationship on the external periphery of each of said gate posts;

an opening defined within each said arcuate section and passing therethrough;

a matching opening defined in the first end and in the second end of each of said gate support posts and passing therethrough, wherein said matching opening is in registry with each said opening defined in each said arcuate section when said arcuate sections are placed in said overlapping relationship on said gate support posts;

a bolt passed through each said opening in each said arcuate section and through each said matching opening in each said gate support post; and a nut threadedly received on each of said bolts.

9. The enclosure of claim 6, wherein said fence means disposed on said gate assembly comprises chain link fencing sized and shaped to correspond to the size of said gate assembly, and wherein said fencing is attached to said gate posts and said rails.

10. The enclosure of claim 1, wherein said fence means disposed on said frame comprises chain link fencing having a generally rectangular shape with two spaced ends, a top edge, and a bottom edge, attached to said frame and enclosing the sides of the space to be enclosed with the exception of that portion of the space enclosed by said gate assembly.

11. The enclosure of claim 10, wherein said chain link fencing further comprises:

a pair of generally upright tension rods, one each of said rods being passed through each spaced end of said chain link fencing;

a plurality of chain link clips for securing each of said tension rods to one of said support posts; and a plurality of fence ties for tying the top edge and the bottom edge of said chain link fencing to said top and bottom rails.

12. The enclosure of claim 1, wherein said enclosure is constructed of galvanized steel.

13. The enclosure of claim 1, wherein the exterior surfaces of said enclosure are powder coated.

14. A compact fenced enclosure for holding an animal within a defined space having at least one side, said enclosure comprising:

a frame, said frame having a plurality of generally upright support posts, each of said posts having a first end and a spaced second end;

a top rail having a first end and a spaced second end;

a bottom rail having a first end and a spaced second end;

wherein said top rail and said bottom rail each comprise an elongated rail having an arcuate section formed at said first end and at said second end, said arcuate sections being oriented along a generally upright axis with respect to each said rail, wherein each of said rails has a plurality of said arcuate sections formed intermediate the ends of each said rail so that each said rail can be placed in an overlapping relationship on at least a portion of the exterior periphery of the first end and the second end of each of said support posts, respectively, and wherein the first end and the second end of each said rail are placed in an overlapping relationship on one of said support posts and are fastened to the first end and to the second end, respectively, of said support post;

an opening defined in each of said arcuate sections;

a matching opening defined in the first end and the second end of each of said support posts for each of said openings in the arcuate sections of said top rail and of said bottom rail;

means for fastening said rails to said support posts;

a gate assembly supported on said frame for permitting passage into and out of the space; and fence means disposed on said frame and said gate assembly, for enclosing the space defined by said enclosure.

15. A compact fenced enclosure defining a space having at least one side, said enclosure comprising:

a) a frame, said frame having a plurality of generally upright support posts, each of said posts having a first end and a spaced second end, and a plurality of top and bottom rails extending in a generally horizontal direction between each of said posts, wherein each of said top and said bottom rails has a first end and a spaced second end;

b) means for fastening said rails to said support posts, wherein the first end of each said top rail is fastened to the second end of each adjacent said top rail and to the first end of each of said posts, and wherein the first end of each said bottom rail is fastened to the second end of each adjacent said bottom rail and to the second end of each of said posts for forming the enclosure about the space;

c) a gate assembly supported on said frame for permitting passage into and out of the space, said gate assembly including:

a pair of generally upright gate posts, each of said posts having a first end and a spaced second end;

a top gate rail and a bottom gate rail extending in a generally horizontal direction between each of said gate posts, wherein each of said gate rails has a first end and a spaced second end;

means for fastening each of said gate rails to each of said gate posts, wherein one each of said gate rails is fastened to the first end and to the second end of each of said gate posts;

pivot means for pivoting said gate assembly into a generally open position and a closed position, said pivot means comprising a plug fitted in the first end and in the second end of one of said gate posts, and a pair of pivot bolts passed through said frame and extending into one each of said plugs for permitting said gate assembly to pivot about said bolts;

latch means for securing said gate assembly in said closed position on said frame; and d) fence means, disposed on said frame and said gate assembly, for enclosing the space defined by the enclosure.

16. A compact fenced enclosure defining a space having at least one side, said enclosure comprising:

a) a frame, said frame having a plurality of generally upright support posts, each of said posts having a first end and a spaced second end, and a plurality of top and bottom rails extending in a generally horizontal direction between each of said posts, wherein each of said top and said bottom rails has a first end and a spaced second end;

b) means for fastening said rails to said support posts, wherein the first end of each said top rail is fastened to the second end of each adjacent said top rail and to the first end of each of said posts, and wherein the first end of each said bottom rail is fastened to the second end of each adjacent said bottom rail and to the second end of each of said posts for forming the enclosure about the space;

c) a gate assembly supported on said frame for permitting passage into and out of the space, said gate assembly including:

a pair of generally upright gate posts, each of said posts having a first end and a spaced second end;

a top gate rail and a bottom gate rail extending in a generally horizontal direction between each of said gate posts, wherein each of said gate rails has a first end and a spaced second end;

means for fastening each of said gate rails to each of said gate posts, wherein one each of said gate rails is fastened to the first end and to the second end of each of said gate posts, said means for fastening said gate rails to said gate support posts including:

an arcuate section formed at the first end and at the second end of each said gate rail, said arcuate sections being oriented along a generally upright axis with respect to each said rail, and wherein each of said arcuate sections is sized and shaped to fit in an overlapping relationship on the external periphery of each of said gate posts;

an opening defined within each said arcuate section and passing therethrough;

a matching opening defined in the first end and in the second end of each of said gate support posts and passing therethrough, wherein said matching opening is in registry with each said opening defined in each said arcuate section when said arcuate sections are placed in said overlapping relationship on said gate support posts;

a bolt passed through each said opening in each said arcuate section and through each said matching opening in each said gate support post; and a nut threadedly received on each of said bolts;

d) pivot means for pivoting said gate assembly into a generally open position and into a closed position;

e) latch means for securing said gate assembly in said closed position on said frame; and f) fence means, disposed on said frame and said gate assembly, for enclosing the space defined by the enclosure.

* * * * *